United States Patent
Remy et al.

(10) Patent No.: US 11,725,255 B2
(45) Date of Patent: Aug. 15, 2023

(54) PRESS HARDENED PART WITH HIGH RESISTANCE TO DELAYED FRACTURE AND A MANUFACTURING PROCESS THEREOF

(71) Applicant: ArcelorMittal, Luxembourg (LU)

(72) Inventors: Blandine Remy, Sanry les Vigy (FR); Thierry Sturel, Le Ban Saint Martin (FR); Emmanuel Lucas, Metz (FR); Gianni Boi, Rombas (FR)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 17/311,677

(22) PCT Filed: Dec. 18, 2018

(86) PCT No.: PCT/IB2018/060219
§ 371 (c)(1),
(2) Date: Jun. 7, 2021

(87) PCT Pub. No.: WO2020/128571
PCT Pub. Date: Jun. 25, 2020

(65) Prior Publication Data
US 2022/0025480 A1    Jan. 27, 2022

(51) Int. Cl.
*B21D 22/02*    (2006.01)
*B32B 15/01*    (2006.01)
(Continued)

(52) U.S. Cl.
CPC .............. *C21D 9/46* (2013.01); *B21D 22/02* (2013.01); *B32B 15/012* (2013.01); *C21D 6/004* (2013.01);
(Continued)

(58) Field of Classification Search
CPC ..... B21D 22/02; B32B 15/012; C22C 38/001; C22C 38/004; C22C 38/02; C22C 38/04;
(Continued)

(56) References Cited

U.S. PATENT DOCUMENTS 6,296,805 B1    10/2001    Laurent et al.
9,238,848 B2    1/2016    Suwa et al.
(Continued)

FOREIGN PATENT DOCUMENTS

CN    102892910 A    1/2013
CN    105441823 A    3/2016
(Continued)

OTHER PUBLICATIONS

Beauvais et al. WO2016016676A1 Google Patents translation, Feb. 4, 2016, entire translation (Year: 2016).*
(Continued)

*Primary Examiner* — Humera N. Sheikh
*Assistant Examiner* — Katherine A Christy
(74) *Attorney, Agent, or Firm* — Davidson, Davidson & Kappel, LLC (57) ABSTRACT

A press hardened coated steel part with high resistance to delayed fracture, the coating containing ($Fe_x$—$Al_y$) intermetallic compounds resulting from the diffusion of iron into an aluminum or an aluminum-based alloy, or an aluminum alloy of a precoating, wherein the chemical composition of the steel includes, in weight: $0.16\% \leq C \leq 0.42\%$, $0.1\% \leq Mn \leq 3\%$, $0.07\% \leq Si \leq 1.60\%$, $0.002\% \leq Al \leq 0.070\%$, $0.02\% \leq Cr \leq 1.0\%$, $0.0005 \leq B \leq 0.005\%$, $0.002\% \leq Mg \leq 0.007\%$, $0.002\% \leq Ti \leq 0.11\%$, $0.0008\% \leq O \leq 0.005\%$, wherein $(Ti) \times (O)^2 \times 10^7 \leq 2$, $0.001\% \leq N \leq 0.007\%$, $0.001\% \leq S \leq 0.005\%$, $0.001\% \leq P \leq 0.025\%$ and optionally one or more elements selected from the list of: $0.005\% \leq Ni \leq 0.23\%$,
(Continued)

$0.005\% \leq Nb \leq 0.060\%$, the remainder being Fe and unavoidable impurities, and wherein the microstructure includes at least 95% martensite.

18 Claims, 3 Drawing Sheets

(51) Int. Cl.
```
      C22C 38/00    (2006.01)
      C22C 38/02    (2006.01)
      C22C 38/04    (2006.01)
      C22C 38/06    (2006.01)
      C22C 38/50    (2006.01)
      C22C 38/54    (2006.01)
      C21D 9/46     (2006.01)
      C21D 6/00     (2006.01)
      C21D 8/02     (2006.01)
```
(52) U.S. Cl.
CPC ............ *C21D 6/005* (2013.01); *C21D 6/008* (2013.01); *C21D 8/0205* (2013.01); *C21D 8/0226* (2013.01); *C21D 8/0263* (2013.01); *C22C 38/001* (2013.01); *C22C 38/004* (2013.01); *C22C 38/02* (2013.01); *C22C 38/04* (2013.01); *C22C 38/06* (2013.01); *C22C 38/50* (2013.01); *C22C 38/54* (2013.01); *C21D 2211/002* (2013.01); *C21D 2211/004* (2013.01); *C21D 2211/005* (2013.01); *C21D 2211/008* (2013.01)

(58) Field of Classification Search
CPC ......... C22C 38/06; C22C 38/50; C22C 38/54; C21D 2211/002; C21D 2211/004; C21D 2211/005; C21D 2211/008
USPC ........................................................ 428/544
See application file for complete search history.

(56) References Cited

U.S. PATENT DOCUMENTS

| | | | |
|---|---|---|---|
| 10,253,388 B2 | 4/2019 | Cho et al. | |
| 10,597,745 B2 | 3/2020 | Drillet et al. | |
| 11,319,610 B2 | 5/2022 | Drillet et al. | |
| 2013/0095347 A1 | 4/2013 | Kawasaki et al. | |
| 2015/0007911 A1 | 1/2015 | Murakami et al. | |
| 2015/0013856 A1 | 1/2015 | Murakami et al. | |
| 2016/0017452 A1 | 1/2016 | Puerta Velasquez et al. | |
| 2019/0185954 A1* | 6/2019 | Kohsaka ................... C23C 2/02 | |
| 2020/0190621 A1 | 6/2020 | Cobo et al. | |

FOREIGN PATENT DOCUMENTS

| | | | | |
|---|---|---|---|---|
| CN | 105849298 A | 8/2016 | | |
| CN | 105874086 A | 8/2016 | | |
| CN | 106702286 A | 5/2017 | | |
| CN | 107810281 A | 3/2018 | | |
| EP | 2312005 A1 | 4/2011 | | |
| EP | 3396010 A1 | 10/2018 | | |
| FR | 2780984 | 1/2000 | | |
| JP | S59166653 A | 9/1984 | | |
| JP | H08120339 A | 5/1996 | | |
| JP | 2003034844 A | 2/2003 | | |
| JP | 2007314817 A | 12/2007 | | |
| JP | 2012237048 A | 12/2012 | | |
| JP | 2013185245 A | 9/2013 | | |
| JP | 2013185246 A | 9/2013 | | |
| WO | WO2008053273 | 5/2008 | | |
| WO | WO 2011/158818 | 12/2011 | | |
| WO | WO-2014128656 A1 * | 8/2014 | ............. | C21D 1/673 |
| WO | WO 2015/039763 A2 | 3/2015 | | |
| WO | WO-2016016676 A1 * | 2/2016 | ............... | B21B 3/02 |
| WO | WO 2018220540 A1 | 12/2018 | | |

OTHER PUBLICATIONS

Codecogs, "Impurities in Steel", Feb. 11, 2009, Codecogs, URL: <https://www.codecogs.com/library/engineering/metallurgy/impurities-in-steel.php>, entire document (Year: 2009).*
See Search Report of PCT/IB2018/0060219 dated Feb. 4, 2019.
Gokhale et al.:"Quantitative Characterization and Representation of Global Microstructural Geometry" (2004), ASM Handbook, vol. 9: Metallography and Microstructures G.F. Vander Voort, editor, p. 428-447, submitted as Appendix A with the response to Office Action filed on Sep. 9, 2022.

* cited by examiner

PRESS HARDENED PART WITH HIGH RESISTANCE TO DELAYED FRACTURE AND A MANUFACTURING PROCESS THEREOF

The invention relates to a steel press hardened part manufactured from a steel sheet which is heated, press formed and rapidly cooled, which provides high tensile mechanical properties with a high resistance to delayed fracture. Such press hardened parts can have complex shapes and ensure anti-intrusion or energy-absorption functions in cars or trucks vehicles.

BACKGROUND

For the manufacturing of recent Body in White structures in the automotive industry, the press hardening process, also called a hot stamping or hot press forming process, is a fast growing technology for the production of steel parts with high mechanical strength, which makes it possible to achieve weight reduction together with high resistance in case of vehicles collisions. Vehicles parts such as bumpers, doors or rails, and pillars can be for example fabricated with this process.

The implementation of press hardening using aluminized precoated sheets or blanks is known in particular from the publications FR2780984 and WO2008053273: a heat treatable aluminized steel sheet is cut to obtain a blank, heated in a furnace and rapidly transferred into a press, hot formed and cooled in the press dies. During the heating in the furnace, the aluminum precoating is alloyed with the steel of the substrate, thus forming compounds ensuring the protection of the steel surface against decarburization and scale formation. Heating is performed in a temperature range which makes it possible to obtain partial or total transformation of the steel substrate into austenite. Thereafter, austenite transforms during the cooling step resulting from the heat extraction from the press dies, into microstructural constituents such as martensite and/or bainite, thus achieving structural hardening of the steel. High hardness and mechanical strength are thereafter obtained after press hardening.

With a 22MnB5 steel composition, the cooling rate must be higher than 50° C./s if full martensitic structure is desired even in the deformed zones of the part. Starting from a tensile strength of about 500 MPa, the final press hardened part has a fully martensitic microstructure and a Tensile strength value of about 1500 MPa.

Such strength level is satisfactory for many applications. However, the demand for reducing the energy consumption of vehicles drives the search for even lighter weight vehicles through the use of parts whose mechanical strength would be even higher, meaning whose tensile strength could reach 1800 or even 2000 MPa. High strength level is generally associated with a complete or very predominant martensitic microstructure in the press hardened part. It is recognized that this type of microstructure has a lower resistance to delayed fracture: after press hardening, the fabricated parts can be susceptible to the appearance of cracks or fracture after some time, under the conjunction of three factors:
- a predominant martensitic microstructure;
- the presence of a sufficient level of applied or residual stresses;
- a sufficient amount of diffusible hydrogen. This element can be introduced during furnace heating of the blanks before the step of hot stamping and press hardening: water vapor present in the furnace can be dissociated and adsorbed on the blank surface. This is particularly the case when heating precoated aluminized steel blanks since the water vapor in the furnace atmosphere reacts with the Al precoating, generating hydrogen which diffuses in steel substrate due to high solubility of this element at high temperature. However, when the press hardened part is cooled down to room temperature, the Al coating acts as a barrier, thus hydrogen is mostly prevented to effuse out of the part. Thus, delayed cracking can eventually occur if the above conditions are simultaneously met.

SUMMARY OF THE INVENTION

In order to solve the problem of delayed fracture of Al precoated press hardened parts, it has been proposed to control rigorously the atmosphere of the heating furnace and the conditions of cutting blanks so to minimize the level of stresses and of stress intensity factors. Performing thermal post-treatments on hot stamped parts has been also proposed in order to allow hydrogen degassing. The deposition of specific coatings on the surface of the steel sheet which reduces hydrogen adsorption has been also proposed. However, a simpler process is sought by the industry which desires a material for avoiding the risk of delayed fracture, which would save additional constraints and costs and which would not need change in the press hardening process control.

Therefore, one is looking for a method for fabricating press hardened aluminized parts which would offer simultaneously a tensile strength TS comprised between 1400 and 2000 MPa and a resistance to delayed fracture threshold $\sigma_{DF}$ with a high value with respect to the TS value, i.e. such as $\sigma_{DF} \geq 3 \times 10^{16} \times TS^{-4.345} + 100$, $\sigma_{DF}$ and TS being expressed in MPa. The simultaneous obtaining of high TS and high $\sigma_{DF}$ is especially desired and difficult to achieve.

The resistance to delayed fracture is measured according to the guidelines of standard SEP1970: "*Test of the resistance of Advanced High Strength Steels (AHSS) for automotive applications against production related hydrogen induced brittle fracture*". To evaluate $\sigma_{DF}$, a specimen including a punched hole with 10 mm radius is submitted to a constant tensile stress. The hole creates macroscopic stress concentration and local plastic deformation inducing damage which may promote delayed fracture initiation. $\sigma_{DF}$ is defined as the ratio of the nominal test load over the section area of the specimen submitted to this load. $\sigma_{DF}$ is measured from tests performed under different applied forces: if fracture occurs before 96 hours testing, further tests are performed under a lower tensile stress value. Thus, the stress level is decreased until no fracture occurs. Three specimens without fracture are required to define the threshold $\sigma_{DF}$, which is the critical value under which no delayed fracture occurs. Thus, this test is considered as severe and discriminant for materials.

It is an object of the present invention to provide a press hardened coated steel part with high resistance to delayed fracture, the coating containing ($Fe_x$—$Al_y$) intermetallic compounds resulting from the diffusion of iron into an aluminum or an aluminum-based alloy, or an aluminum alloy of a precoating, wherein the chemical composition of the steel comprises, in weight: 0.16%≤C≤0.42%, 0.1%≤Mn≤3%, 0.07%≤Si≤1.60%, 0.002%≤Al≤0.070%, 0.02%≤Cr≤1.0%, 0.0005%≤B≤0.005%, 0.002%≤Mg≤0.007%, 0.002%≤Ti≤0.11%, 0.0008%≤O≤0.005%, wherein (Ti)×(O)²×10⁷≤2, 0.001%≤N≤0.007%, 0.001%≤S≤0.005%, 0.001%≤P≤0.025% and optionally one or more elements selected from the list of: 0.005%≤Ni≤0.23%, 0.005%≤Nb≤0.060%, the remainder being Fe and unavoidable impurities, and wherein the microstructure comprises at least 95% martensite.

According to a first embodiment, the press hardened coated steel comprises: 0.18%≤C≤0.35%.

According to a second embodiment, the press hardened coated steel comprises: 0.55%≤Mn≤1.40%.

According to a third embodiment, the press hardened coated steel comprises Si≤0.30%.

According to an embodiment, the average size $d_{av}$ of oxides, carbonitrides, sulfides and oxisulfides is less than 1.7 μm and at least one of the conditions (C1) or (C2) is fulfilled:

(C1): the sum $N_{(MgO+MgO-Al2O3)}$ of the numbers of MgO and MgO—Al$_2$O$_3$ particles per area unit is higher than 90 per mm$^2$, (C2): the number $N_{(MgO-TixOy)}$ of MgO-TixOy particles per area unit is higher than 100 per mm$^2$, the average size of which is lower than 1 μm.

Preferably, the microstructure contains bainite and/or ferrite.

According to another embodiment, the thickness of the press hardened coated steel part is comprised between 0.8 and 4 mm.

According to an embodiment, the tensile strength of the press hardened coated steel part is comprised between 1400 and 2000 MPa.

Preferably, the yield stress of the press hardened coated steel part is higher than 1000 MPa.

The invention relates also to a process for manufacturing a press hardened coated steel part with high resistance to delayed fracture, comprising the following and successive steps:
  providing liquid steel comprising 0.16%≤C≤0.42%, 0.1%≤Mn≤3%, 0.07%≤Si≤1.60%, 0.002%≤Al≤0.070%, 0.02%≤Cr≤1.0%, 0.0005≤B≤0.005%, 0.002%≤Ti≤0.11%, 0.001%≤O≤0.008% wherein (Ti)×(O)$^2$×10$^7$≤2, 0.001%≤N≤0.007%, and optionally: 0.005%≤Ni≤0.23%, 0.005%≤Nb≤0.060%, 0.001%≤S≤0.005%, 0.001%≤P≤0.025%, the remainder being Fe and unavoidable impurities, then
  adding Mg or Mg-alloy so as to obtain liquid steel with a chemical composition as mentioned above, the temperature $T_{addition}$ being comprised between $T_{liquidus}$ and ($T_{liquidus}$+70° C.), then
  casting the liquid steel under the form of a semi-product, the duration to elapsing between the addition of Mg or Mg alloy and the solidification start of the liquid steel being less than 30 minutes, then
  heating the semi-product at a temperature comprised between 1250 and 1300° C. so to obtain a heated semi-product, then
  rolling the semi-product so to obtain a rolled steel sheet, then
  precoating the rolled steel sheet with aluminum or aluminum-based alloy, or aluminum alloy, so to obtain a precoated steel sheet, then
  cutting the precoated steel sheet so to obtain a precoated steel blank, then
  heating the precoated steel blank so to obtain a heated blank with a full austenitic structure, then
  hot press forming the heated blank so to obtain a hot press formed part, then
  cooling the hot press formed part while maintaining it in a press tooling so as to obtain a press hardened coated steel part with a microstructure comprising at least 95% martensite.

According to an embodiment, the duration $t_D$ is less than 1 minute.

According to another embodiment, the duration $t_D$ is less than 10 s.

Preferably, the heating of the precoated blank is performed up to a temperature $\theta_m$ comprised between 890 and 950° C. and a total dwell time $t_m$ comprised between 1 and 10 minutes.

Still preferably, the heating of the precoated steel blank is performed in a furnace with an atmosphere having a dew point comprised between +10 and +25° C.

According to a preferred embodiment, the manufacturing is implemented from a precoated steel sheet with a thickness comprised between 0.8 and 4 mm.

Preferably, the manufacturing is implemented such that the tensile strength of the press hardened coated steel part is comprised between 1400 and 2000 MPa.

Preferably, the manufacturing is implemented such that the yield stress of the press hardened coated steel part is higher than 1000 MPa.

The invention relates also to the use of a press hardened part as mentioned above, or manufactured according to the process mentioned above, for the fabrication of structural or safety parts of motor vehicles.

BRIEF DESCRIPTION OF THE DRAWINGS

The invention will now be described in details and illustrated by examples without introducing limitations, with reference to the appended figures among which:

the FIG. 1 illustrates the distribution size of a population of particles in a press hardened part according to the invention.

the FIG. 2 illustrates the distribution size of a population of particles in a reference press hardened part.

the FIG. 3 illustrates the delayed fracture threshold as a function of the Tensile strength, for press hardened parts of the invention and for reference press hardened parts.

the FIG. 4 illustrates the behaviour in dilatometry test of a press hardened part according to an embodiment of the invention, and of a reference press hardened part.

according to another embodiment of the invention, the FIG. 5 illustrates bainite formation that has occurred while cooling, in presence of Mg-containing particles in a press hardened part according to the invention.

DETAILED DESCRIPTION

The composition and the microstructural features of the press hardened part according to the invention will be now explained. The steel composition comprises, or particularly consists of the following elements, expressed in weight:
  a carbon content comprising between 0.16% and 0.42%. This element plays a major role in the quenchability and the tensile strength obtained after press hardening. Below a content of 0.16% by weight, the tensile strength level TS of 1400 MPa cannot be reached after press hardening. Above a content of 0.42% by weight, the risk of delayed fracture would be increased to such a level than costly coating or element additions, dew point control, would have to be implemented.

With a carbon content comprised between 0.18% and 0.35% by weight, the targeted properties can be obtained stably while keeping the weldability at a satisfactory level and limiting the production costs.

- in addition to its role as deoxidizer, manganese increases the quenchability: its content has to be greater than 0.1% by weight to obtain a sufficiently low transformation start temperature Ms (austenite→martensite) during cooling in the press, which makes it possible to increase the tensile strength of the press hardened part. An increased resistance to delayed fracture can be obtained by limiting the manganese content to 3%. Manganese segregates to the austenitic grain boundaries and increases the risk of intergranular rupture in the presence of hydrogen. A manganese content comprised between 0.55% and 1.40% is more particularly adapted for obtaining higher stress corrosion resistance.
- the silicon content of the steel is comprised between 0.07% and 1.60% by weight: with silicon content over 0.07%, an additional hardening can be obtained and the silicon contributes to the deoxidation of the liquid steel. The content thereof must however be limited to 1.60% in order to avoid the excessive formation of surface oxides that would impair the coatability in hot-dip process. Under this respect, the silicon content is preferably lower than 0.30%.
- in amount higher than or equal to 0.002%, aluminum is an element enabling deoxidation in the liquid metal during elaboration, and contributing to the precipitation of nitrogen. When its content is over 0.070%, it can form coarse aluminates during steelmaking which tend to reduce the ductility.
- chromium increases the quenchability and contributes to obtaining of the tensile strength level desired after press hardening. Above a content equal to 1.0% by weight, the effect of chromium on the homogeneity of the mechanical properties in the press hardened part is saturated. At a quantity higher than 0.02%, this element contributes to increase the tensile strength.
- at a content higher than 0.0005% by weight, boron increases significantly the quenchability. By diffusing into the austenite grain boundaries, it exerts a favorable influence by preventing the intergranular segregation of phosphorus. Over 0.005%, the effect of B is saturated.
- Magnesium is a particularly important element in the invention: a content not less than 0.002% by weight is required to create a sufficient number of particles such as MgO, MgO—$Al_2O_3$ or fine MgOTixOy per area unit, in order to trigger efficiently bainite and/or ferrite formation, and/or to refine the martensitic laths structure, during the cooling step of the part in hot press forming. As explained further, the inventors have put in evidence that the presence of bainite and/or ferrite in the presence of these particles, in a martensitic matrix, even in amount less than 5% in area fraction, increase significantly the resistance to delayed fracture without reducing notably the tensile stress. A magnesium content higher than 0.007% leads to a too high deoxidation level, thus the oxygen content can be too low to provide a sufficient number of particles that are active with respect to bainite and/or ferrite formation, and/or martensite refinement.
- a titanium content not less than 0.002% by weight is necessary to combine with nitrogen. Therefore, titanium protects boron from binding with nitrogen, and free boron is available for increasing quenchability. A titanium content not higher than 0.011% by weight makes it possible to avoid coarse titanium carbonitrides precipitation at the liquid stage, which would drastically reduce the toughness of the press hardened part.
- an oxygen content not less than 0.0008% makes it possible to create a sufficient number of oxides per area unit, which trigger efficiently bainite and/or ferrite formation, and/or martensite refinement. However, when the oxygen content is higher than 0.005%, oxides tend to coarsen and the number of active particles per area unit is reduced.
- Titanium and oxygen contents must be selected not only individually, but also each other in consideration: more specifically, $(Ti) \times (O)^2 \times 10^7$ has to be not higher than 2, the Ti and O contents being expressed in weight percent.

When $(Ti) \times (O)^2 \times 10^7$ is higher than 2, coarse oxides precipitate, and bainite and/or ferrite formation, and/or martensite refinement, tend to occur more scarcely.

The inventors have also evidenced that high resistance to delayed fracture is obtained when some features of the particles are present:

- the average size of oxides, carbonitrides, sulfides and oxisulfides is less than 1.7 µm. The average size $d_{av}$ of particles features is measured by observations on polished specimens with a Scanning Electron Microscope. At least 2000 particles are considered in order to obtain statistically representative data. Once the presence of a particle is identified, its nature is determined through Energy Dispersive Spectrometry by scanning of the whole particle. The maximum ($d_{max}(i)$) and minimum ($d_{min}(i)$) size of each particle (i) is determined through image analysis, then the average size $d_{av}(i)$ of each particle is calculated by: $((d_{max}(i))+(d_{min}(i))/2$, then $d_{av}$ is obtained as the mean value of $d_{av}(i)$ for the (i) particles, irrespectively of their nature (oxides, carbonitrides, sulfides or oxisulfides)
- Without wishing to be bound by a theory, it is believed that an average size of particles less than 1.7 µm increases the delayed fracture resistance since higher (surface/volume) ratio of the particles leads to an enhancement of bainite and/or ferrite formation, and/or martensite refinement. Furthermore, the limitation of day below 1.7 µm contributes to reduce the risk of fracture initiation under external stress.

The inventors have also evidenced that higher resistance to delayed fracture is obtained when at least one of the two conditions, referenced as (C1) and (C2) regarding the features of certain particles, is fulfilled:

- (C1): the sum $N_{(MgO+MgO-Al2O3)}$ of MgO and MgO—$Al_2O_3$ particles per area unit is higher than 90 per mm$^2$,
- (C2): the number $N_{(MgO-TixOy)}$ of MgO-TixOy particles per area unit is higher than 100 per mm$^2$, the average size of which is lower than 1 µm.

The inventors have put into evidence that these particles are stable with respect of the thermomechanical treatment experienced by the blanks during hot press forming, i.e. with respect of the heating in the austenitic domain up to 950° C. and of the deformation during press forming, since it has been observed that these particles do not fracture even in the most deformed areas of the parts. Thus, the features of the particles (nature, size, number) in the blanks before press hardening are similar to the ones on the parts after press hardening.

Without wishing to be bound by a theory, it is believed that the Mg-containing oxides (i.e. MgO, MgO—Al2O3, MgO-TixOy) are especially efficient for enhancing bainite and/or ferrite formation, and/or martensite refinement during the cooling step in hot press forming, which in turn increases resistance to delayed fracture, and that the number of these oxides must be sufficiently high in order to obtain a positive effect.

a nitrogen content higher than over 0.001% makes it possible to obtain precipitation of (Ti (CN), or Ti—Nb(VN) or Nb(CN) if Nb is present, which restricts the austenite grain growth. The content must however be limited to 0.007% so as to avoid the formation of coarse nitrides/carbonitrides precipitates.

In excessive quantities, sulfur and phosphorus tend to increase brittleness. This is why the sulfur content is limited to 0.005% by weight in order to avoid a too high formation of sulfides and oxisulfides. A very low sulfur content, i.e., below 0.001%, is however unnecessarily costly to achieve insofar as it does not provide significant additional benefit.

For similar reasons, the phosphorus content is comprised between 0.001% and 0.025% by weight. In excessive content, this element segregates into the joints of the austenitic grains and increases the risk of delayed fracture by intergranular rupture.

Optionally, the steel composition may also comprise nickel in a content comprised between 0.005 and 0.23% by weight. When located at the surface of the press hardened steel substrate, Ni reduces significantly the sensitivity to delayed fracture, mainly by creating a barrier against penetration of hydrogen into the blank at high temperature. No improvement can be present when Ni content is less than 0.005%. However, since nickel addition is costly, its optional addition is limited to 0.23%.

The steel composition may also optionally comprise niobium: when present in a content higher than 0.005% by weight, Nb forms carbonitrides which can contribute to restrict the austenite grain growth during heating of the blanks. However, its content must not be higher than 0.060% because of its capacity to limit recrystallization during hot rolling, which increases the rolling forces and the fabrication difficulty.

The remainder of the steel composition is iron and unavoidable impurities resulting from elaboration.

The fabrication process of the press hardened part according to the invention will be now explained:

Liquid steel is provided comprising: 0.16%≤C≤0.42%, 0.1%≤Mn≤3%, 0.07%≤Si≤1.60%, 0.002%≤Al≤0.070%, 0.02%≤Cr≤1.0%, 0.0005≤B≤0.005%, 0.002%≤Ti≤0.11%, 0.001%≤O≤0.008%, wherein $0.05 \le (Ti) \times (O)^2 \times 10^7 \le 2$, 0.001%≤N≤0.007%, and optionally: 0.005%≤Ni≤0.23%, 0.005%≤Nb≤0.060%, 0.001%≤S≤0.005%, 0.001%≤P≤0.025%, the remainder being Fe and unavoidable impurities.

At this stage, the oxygen content of the liquid steel takes into account that this content can be slightly reduced due to the further deoxidation by magnesium.

Addition of Mg is performed at the steel shop, either while liquid steel is in a ladle, a tundish placed between a ladle and a continuous casting facility, or in a device placed at the upper section of a continuous casting facility while the steel is fully liquid and starts to solidify immediately afterwards. Due to the low boiling temperature of Mg, this addition is preferably performed through a wire which is supplied at high feeding rate in the liquid steel. Thereby, a sufficient length of the wire is immersed in the liquid steel and can counteract the evaporation of Mg thanks to ferrostatic pressure. Due to the addition of Mg in the liquid steel and its reaction with dissolved oxygen and the eventual reduction of some pre-existing oxides, MgO and/or MgO—Al2O3 and/or MgO-TixOy-oxides, precipitate. TixOy designate compounds such as $Ti_2O_3$, $Ti_3O_5$ . . . .

The temperature $T_{addition}$ at which Mg is added in the liquid steel is comprised between $T_{liquidus}$ (liquidus temperature of the steel) and ($T_{liquidus}+70°$ C.). If $T_{addition}$ is higher than ($T_{liquidus}+70°$ C.), coarse precipitates having an average size larger than 1.7 μm could be created, which reduce the delayed fracture resistance.

Whatever the location of Mg addition (ladle, tundish or initial section of continuous casting facility) the duration $t_D$ elapsing between the Mg addition and the solidification start of liquid steel must not exceed 30 minutes. Otherwise, the decantation of Mg or Mg-containing oxides may be too significant and the number of these particles once the steel has solidified may be insufficient.

For minimizing the decantation phenomenon, addition is performed in the tundish, thus $t_D$ can be lower than 1 minute.

For even higher minimization, addition is performed with $t_D$ lower than 10 s. This can be achieved through addition in a nozzle immersed at the upper part of the continuous casting facility such as a hollow jet nozzle which is a device known per se.

Once the steel is casted under the form of a semi-product, such as slab or ingot, the solidification of the semi-product starts. The solidification is conducted in such a way that the cooling rate Vs at the surface of the semi-product is higher than 30° C./s. This contributes to avoid coarse precipitates having an average size larger than 1.7 μm.

Rolling said semi-product is thereafter performed so to obtain a rolled steel sheet. It can be under the form of a hot-rolled or a further cold-rolled steel sheet, with a thickness in the range of 0.8 and 4 mm. This thickness range is suited to industrial press hardening tools, in particular hot stamping presses.

The rolled sheet can have a uniform thickness or a non-uniform thickness within the mentioned range. In the latter case, it can be obtained by a process known per se, such as tailored rolling.

The rolled sheet is thereafter precoated. In the context of the invention, precoating designates the coating applied to the surface of the flat steel sheet, which has not yet been submitted to a heat treatment which immediately precedes hot press forming and causes diffusion of steel into the precoating.

The precoating can be aluminum or aluminum-based alloy (i.e. aluminum is the main element in weight percentage of the precoating) or aluminum alloy (i.e. aluminum is higher than 50% in weight in the precoating)

The precoated steel sheet can be obtained by hot-dipping in a bath at a temperature of about 670-680° C., the exact temperature depending on the composition of the aluminium based alloy or the aluminium alloy. A preferred precoating is Al—Si which is obtained by hot-dipping the sheet in a bath comprising, by weight, from 5% to 11% of Si, from 2% to 4% of Fe, optionally from 0.0015 to 0.0030% of Ca, the remainder being Al and impurities resulting from the smelting. The features of this precoating are specifically adapted to the thermal cycles of the press hardening process.

The precoating thickness on each side of the steel sheet is comprised between 10 and 35 μm. For a precoating thickness less than 10 μm, the corrosion resistance after press hardening is reduced. If the precoating thickness is more than 35 μm, alloying with iron from the steel substrate is more difficult in the external portion of the precoating, which increases the risk of the presence of a liquid phase in the heating step immediately preceding press hardening, hence the risk of pollution of rollers in the furnaces.

The flat precoated steel sheet, which at this stage has usually a ferrite-pearlite microstructure, is thereafter cut so to obtain a precoated steel blank, the contour geometry of which can be more or less complex in relationship with the geometry of the final press hardened part.

The precoated steel blank is thereafter heated up to a temperature $\theta_m$. The heating is performed advantageously in a single zone or a multizone furnace, i.e. in the latter case having different zones which have their own heating means and setting parameters. Heating can be performed by devices such as burners, radiant tubes, radiant electric resistances or by induction, these means being provided independently or in combination. Due to the composition and the microstructural features of the steel blank, no costly control of dew point of furnace atmosphere is needed. Thus, the dew point can be advantageously comprised between +10 and +25° C.

The precoated steel blank is heated up to a maximum temperature $\theta_m$ which makes it possible to transform the initial steel microstructure into austenite.

According to steel composition, coating features and blank thickness range, the temperature $\theta_m$ is advantageously comprised between 890 and 950° C., the total dwell time $t_m$ in the furnace is comprised between 1 and 10 minutes. During this heat treatment, the precoating transforms, by diffusion from the steel substrate elements, into a coating on the surface of the press hardened part. This coating contains ($Fe_x$—$Al_y$) intermetallic compounds resulting from the diffusion of iron into the precoating.

After maintaining at $\theta_m$, the heated blank is transferred rapidly into a forming press and hot formed so to obtain a part. The part is then kept within the press tooling so as to ensure a proper cooling rate and to avoid distortions due to heterogeneities in shrinkage and phase transformations. The part mainly cools by conduction through heat transfer with the tools. According to the targeted microstructure, the tooling can include coolant circulation so to increase the cooling rate, or can include heating cartridges so as to lower cooling rates. Thus, the cooling rate can be adjusted precisely by taking into account the hardenability of the substrate composition through the implementation of such means. The cooling rate may be uniform in the part or may vary from one zone to another according to the cooling means, thus making it possible to achieve locally increased strength or increased ductility properties.

For achieving high tensile strength, the microstructure in the press hardened part comprises more than 95% martensite. The cooling rate is chosen according to the steel composition, so as to be higher than the critical martensitic cooling rate. As a preferred embodiment for boron steel containing 0.18-0.24% C, the cooling rate from 750 to 400° C. is higher than 40° C./s.

Example

Steel with compositions according to table 1 have been elaborated. The compositions are expressed in weight percent, the remainder being Fe and unavoidable impurities.

Castings have been elaborated by adding Mg-alloy at temperatures comprised between $T_{Liquidus}$ and $T_{Liquidus}$+70° C., the temperature of liquidus for the steel compositions being about 1490° C. The duration $t_D$ elapsing between the addition of Mg alloy and the solidification start of the liquid steel is less than 30 minutes, except for steel RB wherein $t_D$ is 45 minutes.

The solidification has been performed so to obtain cooling rate Vs higher than 30° C./s for all the castings, except for steel RF wherein the cooling rate is lower than 30° C./s.

The obtained semi-products have been heated between 1200° C. and 1255° C. for two hours and further hot-rolled with a finishing temperature of 900° C., down to a thickness of 2.4 mm. These hot-rolled sheets were cold-rolled down to a thickness of 1.2 mm, then precoated with Al—Si. The precoated steel sheets have been thereafter cut so to obtain precoated steel blanks.

The features of the populations of oxides, carbonitrides, sulfides and oxisulfides have been determined by the methodology described above, on polished specimens observed along the rolling direction of the sheet, by analyzing at least 2000 particles.

TABLE 1

Steel compositions (% weight)

| Steel ref.° | C | Mn | Si | Al | Cr | B | Mg | Ti | O | Ti × (O)² × 10⁷ | N | Ni | S | P |
|---|---|---|---|---|---|---|---|---|---|---|---|---|---|---|
| IA | 0.225 | 1.12 | 0.078 | 0.002 | 0.206 | 0.004 | 0.0048 | 0.002 | 0.0036 | 0.3 | 0.0058 | 0.169 | 0.001 | 0.024 |
| IB | 0.216 | 1.13 | 0.077 | 0.002 | 0.171 | 0.0034 | 0.0035 | 0.002 | 0.0043 | 0.4 | 0.0017 | 0.137 | 0.0021 | 0.022 |
| IC | 0.212 | 1.12 | 0.083 | 0.014 | 0.198 | 0.004 | 0.0025 | 0.002 | 0.0023 | 0.1 | 0.0027 | 0.143 | 0.001 | 0.023 |
| ID | 0.198 | 1.12 | 0.124 | 0.011 | 0.197 | 0.0023 | 0.0048 | 0.10 | 0.0011 | 1.2 | 0.003 | 0.221 | 0.001 | 0.022 |
| RA | 0.218 | 1.13 | 0.077 | 0.002 | 0.17 | 0.0036 | 0.0036 | 0.077 | 0.0049 | <u>18.5</u> | 0.001 | 0.164 | 0.0016 | 0.022 |
| RB | 0.205 | 1.12 | 0.078 | <u>0.001</u> | 0.198 | 0.0039 | <u>0.0011</u> | 0.002 | 0.0039 | 0.3 | 0.002 | 0.052 | 0.001 | 0.022 |
| RC | 0.220 | 1.12 | 0.077 | 0.040 | 0.208 | 0.0034 | 0.0048 | 0.059 | 0.0024 | <u>3.4</u> | 0.0061 | 0.169 | 0.0025 | 0.025 |
| RD | 0.215 | 1.20 | <u>0.036</u> | 0.002 | 0.171 | 0.0025 | <u>0</u> | 0.002 | 0.0046 | 0.4 | 0.0025 | 0.002 | 0.001 | 0.022 |
| RE | 0.216 | 1.12 | 0.075 | 0.034 | 0.207 | 0.0031 | <u>0</u> | 0.059 | 0.0025 | <u>3.7</u> | 0.0065 | 0.002 | 0.001 | 0.024 |
| RF | 0.221 | 1.12 | 0.077 | 0.002 | 0.171 | 0.0034 | <u>0.0015</u> | 0.002 | <u>0.0068</u> | 0.9 | 0.0014 | 0.065 | 0.0017 | 0.021 |
| RG | 0.233 | 1.18 | 0.255 | 0.029 | 0.180 | 0.0016 | <u>0</u> | 0.034 | 0.001 | 0.3 | 0.0043 | 0.017 | 0.0016 | 0.010 |
| RH | 0.216 | 1.11 | 0.076 | 0.002 | 0.207 | 0.0039 | <u>0</u> | 0.033 | <u>0.007</u> | <u>16.2</u> | 0.0058 | 0.002 | 0.001 | 0.023 |
| RI | 0.204 | 1.11 | 0.080 | 0.013 | 0.200 | 0.0033 | <u>0</u> | 0.002 | 0.0025 | 0.1 | 0.0026 | 0.002 | 0.0011 | 0.023 |

Underlined values: out of the invention

Press hardened parts have been manufactured according to the conditions mentioned in table 2. At $\theta_m$=900° C., the structure of the steels is austenitic. The dew point has been controlled by mixing a first dry gaseous flux with a second gaseous flux including moisture, the relative quantity of the second flux making it possible to achieve different values of dew point. The press hardened parts have been referenced according to their composition and to the press hardening manufacturing process: for example, IA2 refers for to steel IA cut under the form of blank and thereafter press hardened according to condition 2.

TABLE 2

Manufacturing Conditions of the Press Hardened Parts

| Condition | Temperature $\theta_m$ (° C.) | Total dwell time $t_m$ (mn) | Dew point (° C.) | Cooling rate from 750 to 400° C. (° C./s) |
|---|---|---|---|---|
| 1 | 900 | 5 | 15 | 300 |
| 2 | 900 | 6 | 20 | 300 |

In all cases, the microstructure comprises at least 95% martensite, this quantity being expressed either in area or in volume fraction. The coating contains ($Fe_x$—$Al_y$) intermetallic compounds resulting from the diffusion of iron into the Al—Si precoating. Features concerning the particles in the press hardened parts are presented in Table 3.

TABLE 3

Particles features in the press hardened parts

| | average size of oxides, carbonitrides sulfides and (oxisulfides $d_{av}$ (μm) | (C1): $N_{(MgO + MgO—Al2O3)}$ (N/mm²) | $(C2)_1$: $N_{(MgO—TixOy)}$ (N/mm²) | $(C2)_2$: average size of (MgO—TixOy) particles (μm) | Is at least one of (C1) or $(C2)_1$ – $(C2)_2$ fulfilled? |
|---|---|---|---|---|---|
| IA2 | 1.1 | 355 | 0 | n.a. | Yes |
| IB2 | 1.6 | 98 | 8 | 2.8 | Yes |
| IC1 | 1.3 | 143 | 0 | n.a. | Yes |
| ID2 | 1.2 | 18 | 140 | 0.9 | Yes |
| RA2 | 1.3 | 0 | 169 | 1.3 | No |
| RB1 | 4.6 | 0 | 0 | n.a. | No |
| RC2 | 1.7 | 0 | 100 | 1.5 | No |
| RD1 | 1.5 | 0 | 0 | n.a. | No |
| RE2 | 2.2 | 0 | 0 | n.a. | No |
| RF1 | 3.4 | 0 | 5 | 4.5 | No |
| RG2 | 2.1 | 0 | 0 | n.a. | No |
| RH2 | 2.3 | 0 | 0 | n.a. | No |
| RI2 | 2.2 | 0 | 0 | n.a. | No |

Underlined values: out of the invention
n.a.: not applicable

The tensile properties (Yield Stress YS, Tensile Strength TS) have been measured on the press hardened parts according to ISO 6892-1 standard and reported in Table 4.

As described above, the resistance to delayed fracture $\sigma_{DF}$ of the press hardened parts has been measured according to the guidelines of standard SEP1970. Specimens with a punched hole of 10 mm radius have been submitted to a constant tensile stress during 96 hours until an eventual fracture. The $\sigma_{DF}$ values have been also reported in Table 4.

TABLE 4

Mechanical features of the press hardened parts

| | Yield stress YS (MPa) | Tensile strength TS (MPa) | Delayed fracture threshold $\sigma_{DF}$ (MPa) | $(3 \times 10^{16} \times TS^{-4.345} + 100)$ (MPa) | Is $\sigma_{DF} > 3 \times 10^{16} \times TS^{-4.345} + 100$ MPa? |
|---|---|---|---|---|---|
| IA2 | 1085 | 1490 | 950 | 589 | Yes |
| IB2 | 1060 | 1430 | 925 | 685 | Yes |
| IC1 | 1080 | 1475 | 850 | 611 | Yes |
| ID2 | 1150 | 1515 | 750 | 555 | Yes |
| RA2 | 1110 | 1475 | 575 | 611 | No |
| RB1 | 1100 | 1480 | 550 | 604 | No |
| RC2 | 1150 | 1545 | 450 | 518 | No |
| RD1 | 1090 | 1470 | 475 | 619 | No |
| RE2 | 1110 | 1490 | 450 | 589 | No |
| RF1 | 1055 | 1430 | 475 | 685 | No |
| RG2 | 1150 | 1545 | 350 | 518 | No |
| RH2 | 1090 | 1480 | 350 | 604 | No |
| RI2 | 1065 | 1445 | 350 | 659 | No |

Underlined values: out of the invention

Figure 3:
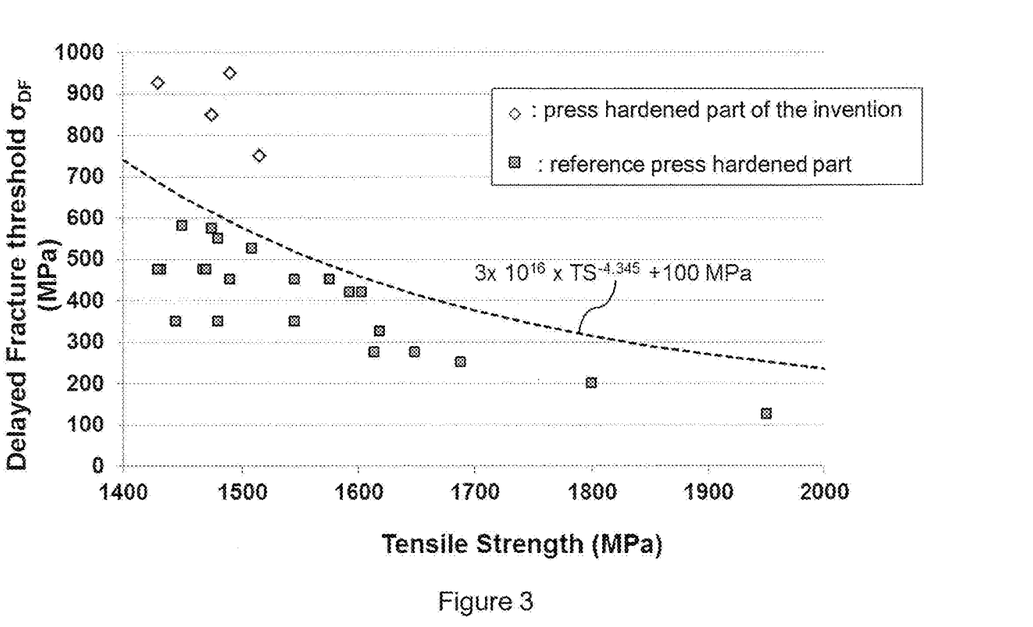

As shown in FIG. 3, press hardened parts IA2 to ID2 according to the invention display high delayed fracture resistance since $\sigma_{DF}$ notably exceeds the value of $3 \times 10^{16} \times TS^{-4.345} + 100$ MPa.

Figure 1:
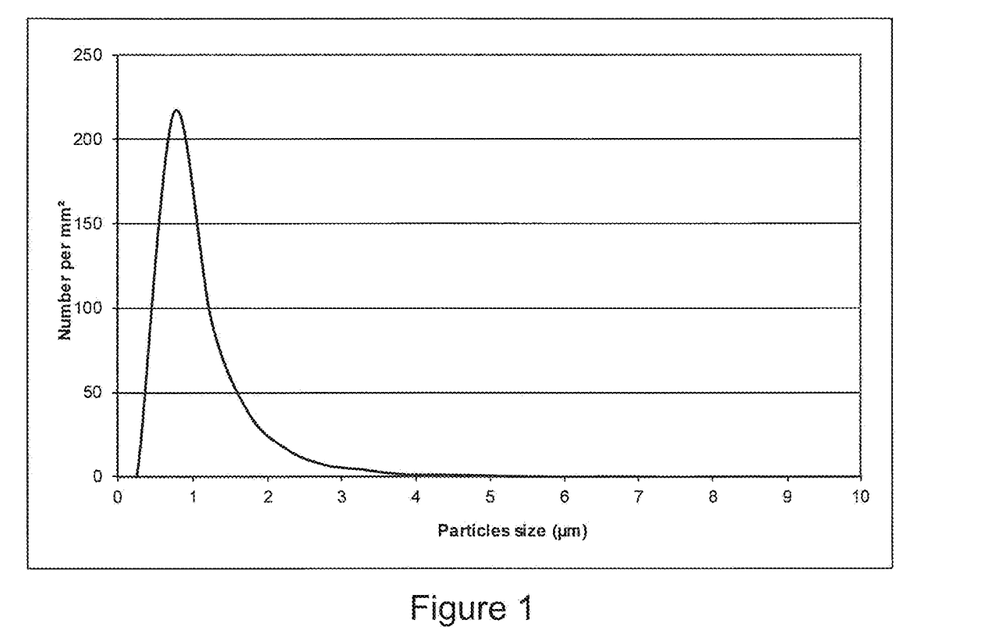

FIG. 1 illustrates the particle size distribution of particles in press hardened part IA2. The majority of particles are very fine, the average size day being 1.1 μm.

Even if containing Mg in adequate content, the press hardened part RA2 has a too high content Tix(O)², it does not contain MgO and MgO—Al2O3 particles and the average size of its (MgO-TixOy) particles exceeds 1 μm.

Press hardened part RB1 has a too low content in Mg and Al, the duration $t_D$ is higher than 30 minutes. Complex (Mn—Mg) oxides are present instead of MgO, MgO—$Al_2O_3$, MgO-TixOy, thus neither condition (C1) or (C2) is fulfilled.

The press hardened part RC2 has a too high content Tix(O)² and its average size of particles is too large, neither condition (C1) or (C2) is fulfilled.

Press hardened part RD1 has no Mg and too low Si content, thus its delayed fracture resistance is insufficient.

The press hardened part RE2 has no Mg and a too high content $Ti\times(O)^2$, its average size of particles is too large, thus its delayed fracture resistance is also insufficient.

Figure 2:
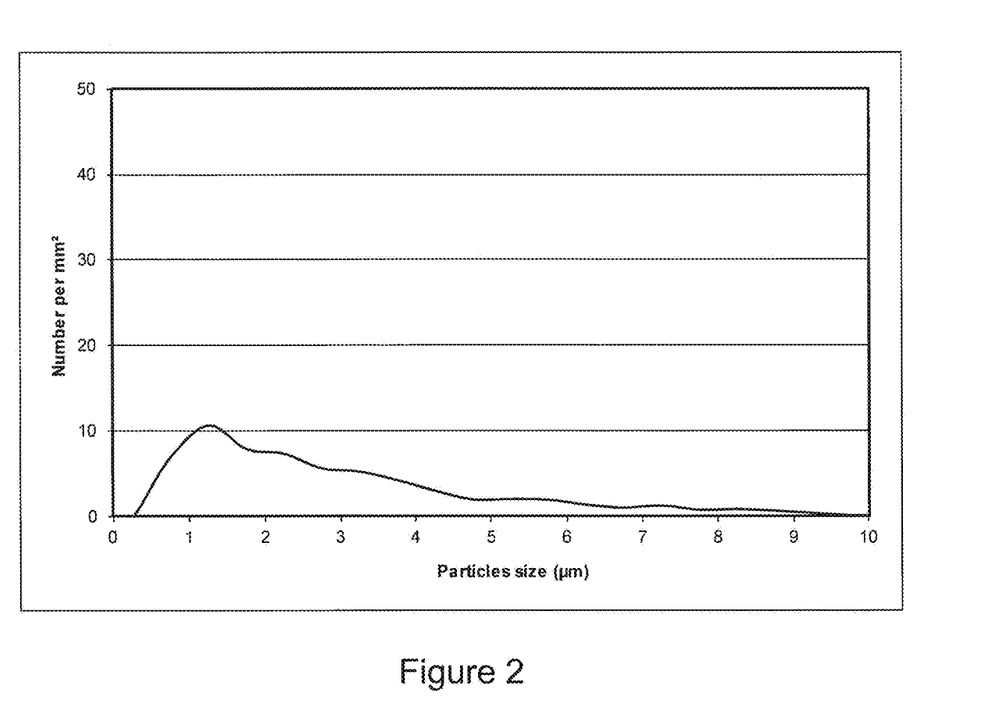

Due to its too low Mg content, its too high O content and its too low cooling rate at solidification, the average size of particles in RF1 is too high as may be seen on FIG. 2, and neither condition (C1) nor (C2) is fulfilled.

Press hardened part RG2 has no Mg, its average size of particles is too important, neither condition (C1) or (C2) is fulfilled.

The press hardened part RH2 has no Mg and a too high content in O and in $Ti\times(O)^2$, its average size of particles is too high, thus its delayed fracture resistance is insufficient.

The press hardened part RI2 has no Mg, its average size of particles is too high, thus its delayed fracture resistance is also insufficient.

Figure 4:
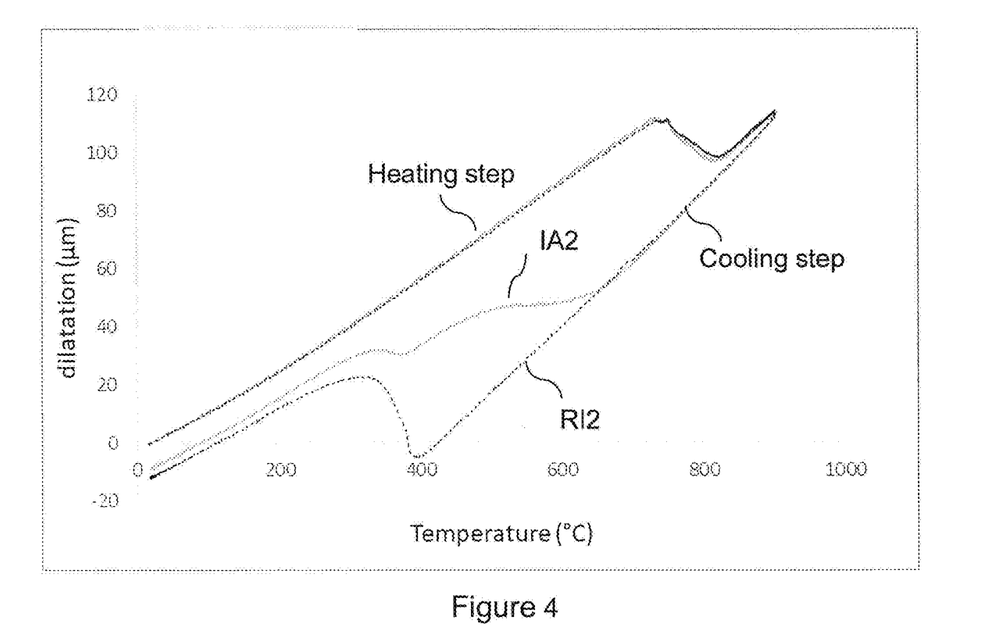

Moreover, FIG. 4 compares the transformation curves obtained by dilatometry of IA2 (invention) and RI2 (reference) These curves are obtained by heating specimens at 900° C. and cooled with a cooling rate of 80° C./s between 750 and 400° C.

Figure 5:
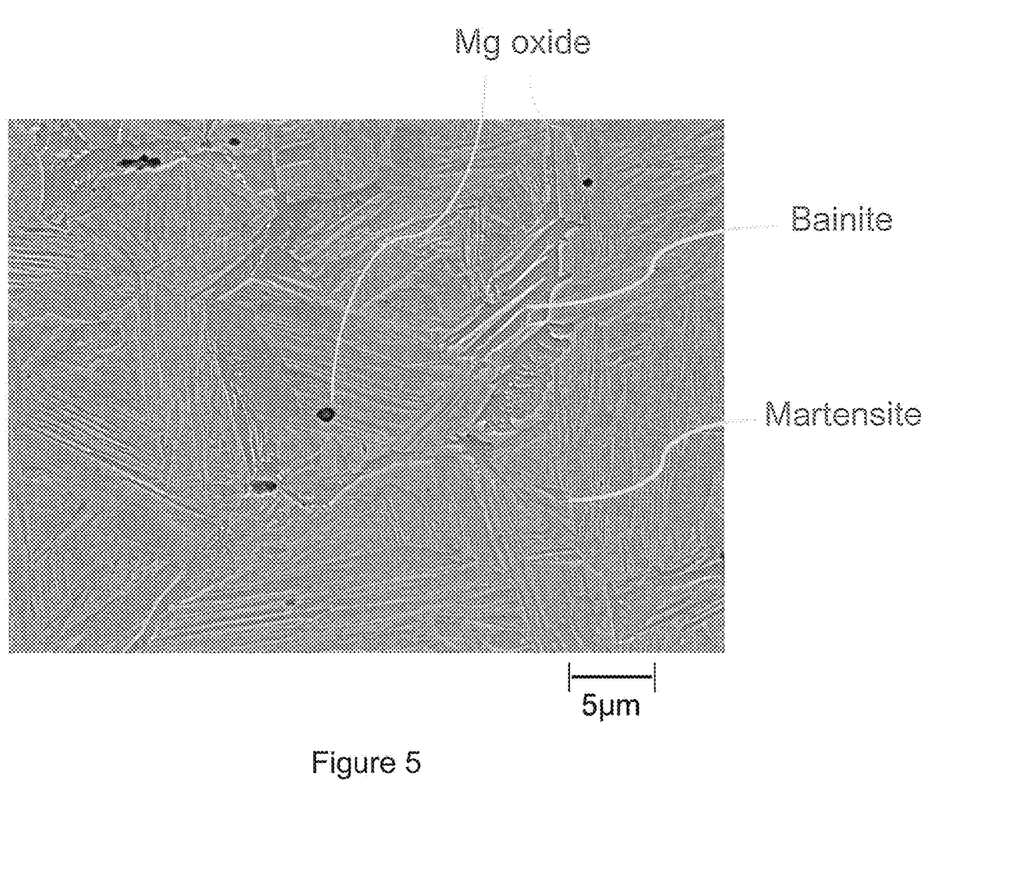

During the heating step, the two specimens behave similarly and undergo full austenitic transformation. During the cooling step, their transformation kinetics is different: RI2 does not show allotropic transformation before about 400° C., temperature from which martensite transformation starts. Therefore, the microstructure of RI2 is fully martensitic. By contrast, IA2 shows a first transformation starting at about 650° C. followed by a second transformation at about 400° C. indicating martensite start. Metallographic observations reveal that bainite transformation has occurred, even for cooling rate as high as 150° C./s, in presence of MgO and MgO—Al2O3 particles. FIG. 5, obtained with Scanning Electron Microscopy, illustrates these microstructural features. Although the bainite fraction is less than 5% in IA2, this feature contributes to obtain high $\sigma_{DF}$ values. Therefore, in a surprising manner, it is demonstrated that it is possible to achieve high tensile values even without full martensitic transformation, a small amount of bainite in the presence of specific particles contributing significantly to achieve high resistance to delayed cracking.

Thus, the press hardened coated steel parts manufactured according to the invention can be used with profit for the fabrication of structural or safety parts of vehicles.

What is claimed is:

1. A press hardened coated steel part, comprising a base of steel and a coating, the coating containing (Fex-Aly) intermetallic compounds resulting from the diffusion of iron into an aluminum or an aluminum-based alloy, or an aluminum alloy of a precoating, wherein the chemical composition of the steel comprises, in weight:

0.16%≤C≤0.42%
0.1%≤Mn≤3%
0.07%≤Si≤1.60%
0.002%≤Al≤0.070%
0.02%≤Cr≤1.0%,
0.0005≤B≤0.005%
0.002%≤Mg≤0.007%
0.002%≤Ti≤0.11%
0.0008%≤0≤0.005%
wherein $(Ti)\times(O)^2\times 107 \leq 2$
0.001%≤N≤0.007%
0.001%≤S≤0.005%
0.001%≤P≤0.025%
and optionally one or more elements selected from:
0.005%≤Ni≤0.23%, and
0.005%≤Nb≤0.060%,
a remainder being Fe and unavoidable impurities,
and wherein a microstructure of the steel includes at least 95% martensite, by area or volume fraction;
wherein a tensile strength of the press hardened steel part is between 1400 and 2000 MPa;
and wherein, the press hardened steel part has a resistance to delayed fracture greater than or equal to $3\times10^{16}\times TS^{-4.345}+100$, wherein TS is said tensile strength.

2. The press hardened coated steel part as recited in claim 1 wherein, 0.18%≤C≤0.35%.

3. A press hardened coated steel part, comprising a base of steel and a coating, the coating containing (Fex-Aly) intermetallic compounds resulting from the diffusion of iron into an aluminum or an aluminum-based alloy, or an aluminum alloy of a precoating, wherein the chemical composition of the steel comprises, in weight:

0.16%≤C≤0.42%
0.55%≤Mn≤1.40%
0.07%≤Si≤1.60%
0.002%≤Al≤0.070%
0.02%≤Cr≤1.0%,
0.0005≤B≤0.005%
0.002%≤Mg≤0.007%
0.002%≤Ti≤0.11%
0.0008%≤0≤0.005%
wherein $(Ti)\times(O)^2\times 107 \leq 2$
0.001%≤N≤0.007%
0.001%≤S≤0.005%
0.001%≤P≤0.025%
and optionally one or more elements selected from:
0.005%≤Ni≤0.23%, and
0.005%≤Nb≤0.060%,
a remainder being Fe and unavoidable impurities,
and wherein a microstructure of the steel includes at least 95% martensite, by area or volume fraction.

4. The press hardened coated steel part as recited in claim 1 wherein, 0.07%≤Si≤0.30%.

5. A press hardened coated steel part, comprising a base of steel and a coating, the coating containing (Fex-Aly) intermetallic compounds resulting from the diffusion of iron into an aluminum or an aluminum-based alloy, or an aluminum alloy of a precoating, wherein the chemical composition of the steel comprises, in weight:

0.16%≤C≤0.42%
0.1%≤Mn≤3%
0.07%≤Si≤1.60%
0.002%≤Al≤0.070%
0.02%≤Cr≤1.0%,
0.0005≤B≤0.005%
0.002%≤Mg≤0.007%
0.002%≤Ti≤0.11%
0.0008%≤0≤0.005% wherein $(Ti) \times (0)^2 \times 107 \leq 2$
0.001% ≤ N ≤ 0.007%
0.001% ≤ S ≤ 0.005%
0.001% ≤ P ≤ 0.025%
and optionally one or more elements selected from:
0.005% ≤ Ni ≤ 0.23%, and
0.005% ≤ Nb ≤ 0.060%,
a remainder being Fe and unavoidable impurities,
wherein a microstructure of the steel includes at least 95% martensite, by area or volume fraction; and
wherein an average size $d_{av}$ of oxides, carbonitrides, sulfides and oxisulfides is less than 1.7 μm and wherein at least one of conditions (C1) or (C2) is fulfilled:
(C1): the sum N(MgO+MgO—Al$_2$O$_3$) of the numbers of MgO and MgO—Al$_2$O$_3$ particles per area unit is higher than 90 per mm$^2$,
(C2): the number N(MgO-TixOy) of MgO-TixOy particles per area unit is higher than 100 per mm$^2$ with the average size lower than 1 μm.

6. The press hardened coated steel part as recited in claim 1, wherein the microstructure contains bainite and/or ferrite.

7. The press hardened coated steel part as recited in claim 1, wherein a thickness of the coated steel part is comprised between 0.8 and 4 mm.

8. The press hardened coated steel part as recited in claim 1, wherein a yield stress is higher than 1000 MPa.

9. A process for manufacturing a press hardened coated steel part according to claim 1, comprising the following and successive steps:
providing liquid steel comprising by weight: 0.16% ≤ C ≤ 0.42%, 0.1% ≤ Mn ≤ 3%, 0.07% ≤ Si ≤ 1.60%, 0.002% ≤ Al ≤ 0.070%, 0.02% ≤ Cr ≤ 1.0%, 0.0005 ≤ B ≤ 0.005%, 0.002% ≤ Ti ≤ 0.11%, 0.001% ≤ 0 ≤ 0.008% wherein $(Ti) \times (0)^2 \times 107 \leq 2$, 0.001% ≤ N ≤ 0.007%, and optionally: 0.005% ≤ Ni ≤ 0.23%, 0.005% ≤ Nb ≤ 0.060%, 0.001% ≤ S ≤ 0.005%, and 0.001% ≤ P ≤ 0.025%, a remainder being Fe and unavoidable impurities, then;
adding Mg or Mg-alloy at a temperature $T_{addition}$ so as to obtain a further liquid steel with a chemical composition by weight: 0.16% ≤ C ≤ 0.42%, 0.1% ≤ Mn ≤ 3%, 0.07% ≤ Si ≤ 1.60%, 0.002% ≤ Al ≤ 0.070%, 0.02% ≤ Cr ≤ 1.0%, 0.0005 ≤ B ≤ 0.005%, 0.002% ≤ Mg ≤ 0.007%, 0.002% ≤ Ti ≤ 0.11%, 0.0008 ≤ 0 ≤ 0.005%, wherein $(Ti) \times (0)^2 \times 107 \leq 2$, 0.001% ≤ N ≤ 0.007%, 0.001% ≤ S ≤ 0.005%, 0.001% ≤ P ≤ 0.025%, and optionally one or more elements selected from: 0.005% ≤ Ni ≤ 0.23%, and 0.005% ≤ Nb ≤ 0.060%, a remainder being Fe and unavoidable impurities, the temperature $T_{addition}$ being between $T_{liquids}$ and ($T_{liquids}$+70° C.); then
casting the liquid steel in the form of a semi-product, a duration $t_D$ elapsing between the addition of Mg or Mg alloy and the solidification start of the liquid steel being less than 30 minutes; then
heating the semi-product at a temperature between 1250 and 1300° C. so to obtain a heated semi-product; then
rolling the semi-product so to obtain a rolled steel sheet; then
precoating the rolled steel sheet with aluminum or aluminum-based alloy, or aluminum alloy so to obtain a precoated steel sheet; then
cutting the precoated steel sheet so to obtain a precoated steel blank; then
heating the precoated steel blank so to obtain a heated blank with a full austenitic structure; then
hot press forming the heated blank so to obtain a hot press formed part, then
cooling the hot press formed part while maintaining the hot press formed part in a press tooling so as to obtain a press hardened coated steel part with a microstructure comprising at least 95% martensite, by area or volume fraction;
wherein a tensile strength of the press hardened steel part is between 1400 and 2000 MPa;
and wherein, the press hardened steel part has a resistance to delayed fracture greater than or equal to $3 \times 10^{16} \times TS^{-4.345}+100$, wherein TS is said tensile strength.

10. The process as recited in claim 9, wherein the duration $t_D$ is less than 1 minute.

11. The process as recited in claim 9, wherein the duration $t_D$ is less than 10 s.

12. The process as recited in claim 9, wherein a cooling rate Vs at a surface of the semi-product is higher than 30° C./s.

13. The process as recited in claim 9, wherein the heating of the precoated steel blank is performed up to a temperature Om between 890 and 950° C. and a total dwell time $t_m$ between 1 and 10 minutes.

14. The process as recited in claim 9, wherein the heating of the precoated steel blank is performed in a furnace with an atmosphere having a dew point comprised between +10 and +25° C.

15. The process as recited in claim 9, wherein a thickness of the precoated steel sheet is comprised between 0.8 and 4 mm.

16. The process as recited in claim 9, wherein a yield stress of the press hardened coated steel part is higher than 1000 MPa.

17. A method for fabrication of structural or safety parts of motor vehicles comprising performing the process as recited in claim 9.

18. A method for fabrication of structural or safety parts of motor vehicles comprising using the press hardened coated steel as recited in claim 1.

* * * * *